Dec. 8, 1942.    C. M. HELLER    2,304,356
MECHANISM CONTROL
Filed April 21, 1941
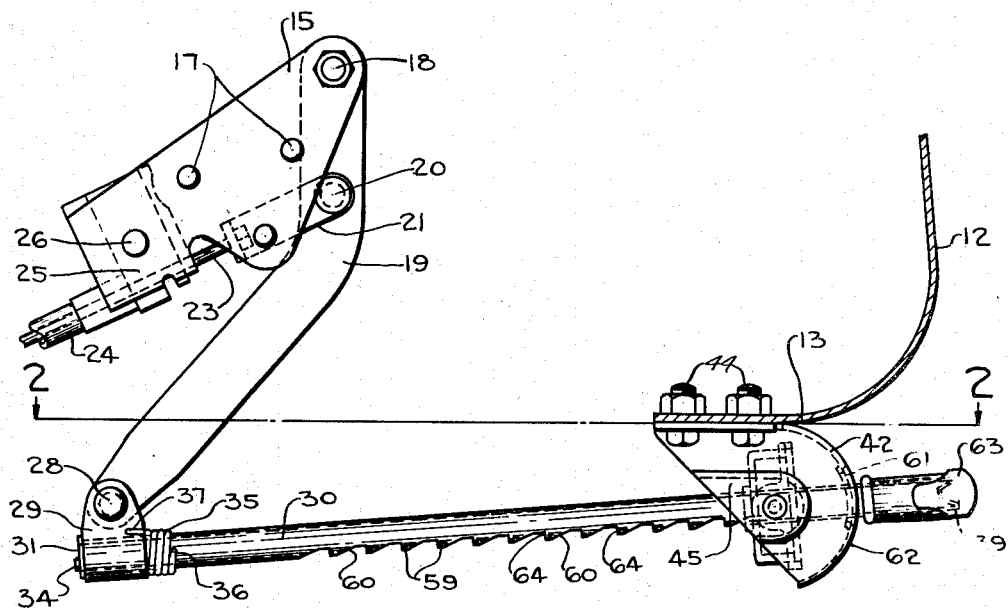
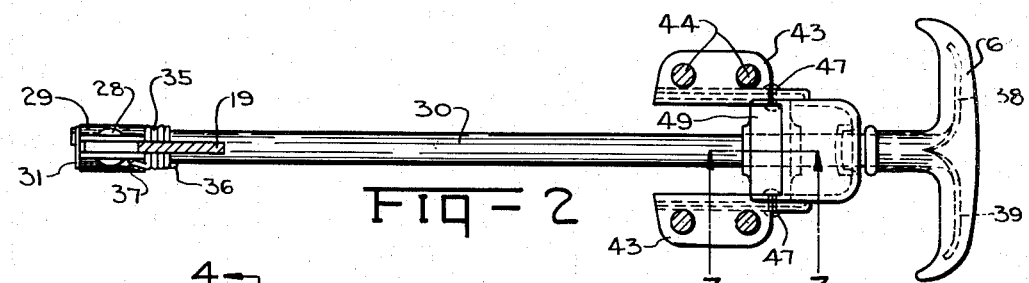
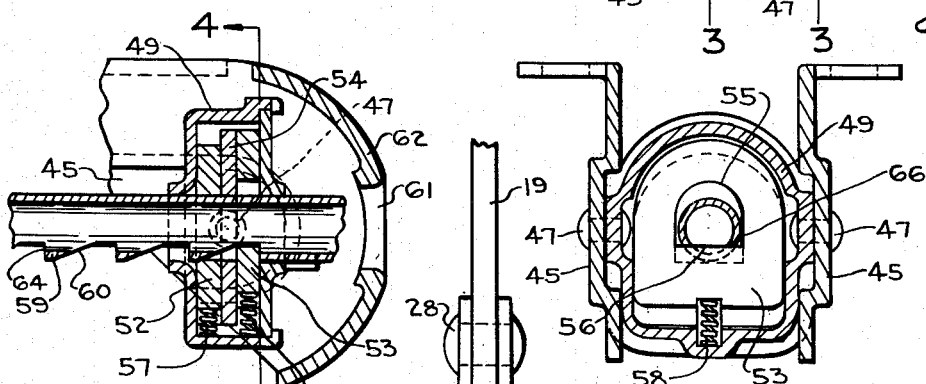
INVENTOR
Clifford M. Heller
BY
Braselton, Whitcomb Davies Patented Dec. 8, 1942

2,304,356

UNITED STATES PATENT OFFICE 2,304,356

MECHANISM CONTROL

Clifford M. Heller, Toledo, Ohio, assignor to The Bingham Stamping Company, Toledo, Ohio, a corporation of Ohio Application April 21, 1941, Serial No. 389,498

5 Claims. (Cl. 74—541)

This invention relates to mechanism control and more especially to an arrangement for actuating or controlling the brake mechanism of an automotive vehicle.

The invention comprehends an arrangement of brake controlling mechanism having a manipulating means arranged for movement in a longitudinal direction for actuating the vehicle brake mechanism to "set" position, said manipulating means being capable of movement in another direction to effect the release of the brake mechanism.

The invention embraces the provision of simple and effective manually operable means for controlling a vehicle brake mechanism which is especially adapted for mounting adjacent the instrument panel of the vehicle so that the manipulating means is within convenient reach of the vehicle operator.

A further object of the invention resides in the provision of positive yet simple and effective locking means for holding the brake manipulating means in adjusted or "brake set" position.

Still another object of the invention is the provision of a "pull" type brake actuating means in which the major number of elements or parts are fabricated of sheet metal thus enhancing the interchangeability of the parts as well as effecting economy in manufacture and assembly.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing a form of mechanism control means of my invention;

Figure 2 is a horizontal sectional view taken substantially on the line 2—2 of Figure 1;

Figure 3 is an enlarged fragmentary sectional view taken substantially on the line 3—3 of Figure 2;

Figure 4 is a sectional view taken substantially on the line 4—4 of Figure 3;

Figure 5 is an enlarged end view of a portion of the mechanism of my invention.

While I have illustrated the control mechanism of my invention as utilized for manipulating or controlling the emergency brakes of an automotive vehicle, it is to be understood that I contemplate the utilization of my invention in conjunction with any mechanism where the same may be found to be applicable.

Referring to the drawing in detail, I have illustrated an embodiment of the invention suitable for mounting in the operator's compartment of a vehicle wherein numeral 12 indicates the vehicle instrument panel, the latter having a laterally extending flange 13. There is positioned to the rear of the instrument panel a support 15 which is secured to a cowl frame member (not shown) of the vehicle by rivets or other means passing through openings 17 in the support. Fulcrumed upon the support 15 by means of a rivet or stub shaft 18 is a depending lever 19 of the second order of levers. Intermediate the ends of the lever is a stub shaft or rivet 20 which pivotally connects a clevis 21 to the lever 19, the clevis being connected to a flexible brake actuating cable 23, the other extremity of which is connected to the vehicle brake mechanism (not shown). The cable 23 is suitably contained within and guided by a sheath 24, the sheath terminating adjacent and being held to the support 15 by means of a clamp 25 and a bolt 26.

Pivotally connected to the lower end of lever 19 by means of a rivet 28 is a U-shaped member or bracket 29 having its bight portion of cylindrical configuration to receive and accommodate the end portion of a member or tube 30. The extremity of the tube is flanged laterally as at 31 and the flange terminating in a radial notch bounded by walls 32 and 33. The member 29 is formed with a projection 34 which extends into the radial notch formed in flange 31. The flange 31 serves to position member 29 with respect to the tube 30 and the walls 32 and 33 of the notch cooperate with the projection 34 to limit relative rotative movement of tube 30 in member 29 for a purpose to be hereinafter explained. Surrounding the tube 30 and adjacent member 29 is a coil spring 35 having one extremity 36 passing through an opening in the side wall of the tube 30, the other extremity 37 of the spring projecting through an opening in a wall of member 29, the spring serving to normally urge the tube 30 to a position as shown in Figures 1 and 5 with the projection 34 in engagement with wall 32 of the flange 31.

Positioned adjacent the flange 13 of the vehicle instrument panel 12 is a bracket or escutcheon 42 having laterally extending flanges 43 provided with openings which receive rivets or other securing means 44 for attaching the bracket 42 to the flange 13 of the instrument panel. The bracket or escutcheon 42 is formed with spaced side walls 45, the latter having aligned openings arranged to receive rivets 47, the rivets also passing through openings in the side walls of a housing 49 as shown in Figures 2 and 4 whereby the housing 49 is journalled for movement about the axis of rivets 47. The housing 49 is of hollow configuration and is arranged to contain slidable pawls or retaining members 52 and 53 which are separated by means of a spacer or plate 54 as shown in Figure 3, the pawl members 52 and 53 being of substantially the same configuration. Each of these members is provided with an opening 66 of the character disclosed in Figure 4 of the drawing having a semi-cylindrical upper wall 55 and a uniplanar lower wall 56. Positioned beneath each of the slidable pawls 52 and 53 are expansive coil springs 57 and 58 which at all times serve to resiliently urge the pawls into engagement with teeth 59 formed in the tube or rod 30. The cooperative engagement of pawls 52 and 53 with the teeth in the tube 30 serve to restrain return movement of the tube 30 until release is effected as hereinafter explained.

Tube 30 projects through an opening 61 in the curved forward surface 62 of the escutcheon 42, the exterior surface 62 being preferably curved to present a pleasing appearance, the curvature being preferably generated about the axis of rivets 47 which support the housing 49 upon the escutcheon 42. Secured to the extremity of tube 30 is a manipulating means or handle 63 which provides a manual means for withdrawing the tube or rod 30 through the housing 49 and escutcheon 42 and effecting a counterclockwise movement of lever 19 about its fulcrum or pivot shaft 18 when it is desired to "set" the braking mechanism. The handle 63 is preferably made of molded material, as for example phenol condensation derivatives or any of the so-called plastics. In the embodiment illustrated the extremity of tube 30 which is of comparatively thin wall construction is split forming two laterally extending portions 38 and 39, as particularly shown in Figures 1 and 2, and the handle 63 molded upon the configuration formed by the split end of tube 30. In this arrangement the metal portions 38 and 39 form a substantial core for the molded handle member. It is to be noted that the opening 61 is of elongated configuration to accommodate the slight vertical movement of the rod as it passes through bracket 42. This movement of the rod 30 is due to the fact that the shaft 28 connecting bracket or member 29 with the lever 19 moves in an arc about the shaft 18 at a center, which arcuate movement of member 29 results in a vertical oscillatory movement of the rod 30 as well as a slight oscillatory movement of the housing 49.

The operation of the arrangement of my invention is as follows:

Figure 1 illustrates the lever 19, rod 30 and associated elements in "brake released" position. When it is desired to effect a setting of the vehicle brake mechanism, the vehicle operator grasps the manipulating handle 63 and exerts longitudinal pull on tube 30 moving same through opening 61 in bracket 42, through the housing 49 as well as through the openings 55 in the vertically slidable pawls 52 and 53. This longitudinal movement of rod 30 effects a counterclockwise movement of the lever 19 about its fulcrum 18 and carries with it the clevis 21 and the brake cable 23, the mechanism being moved until the brakes are brought to an effectively "set" position through the movement of cable 23 connected thereto. In this position one or the other of the slidable pawls 52 or 53 is in position to engage against a face 64 of one of the teeth 59 in the tube 30 to restrain movement of the tube and thus retain the brakes in set position. It is to be noted that the configuration of the teeth 59 in direction of movement of the manipulating means toward brake setting position are gradually inclined as at 60 so that the pawls 52 and 53 readily over-ride the teeth 59 until the mechanism is brought to brake setting position. As the other faces 64 of the teeth are substantially at right angles to the longitudinal axis of the tube 30, the pawls 52 and 53 readily engage faces 64 of the teeth to prevent retrograde movement of the tube 30. It should be noted that spring 35 at all times urges the tube 30 to a position in which lug or projection 34 engages wall 32 of the notch in the flange at the end of the tube so as to maintain the manipulating means 63 in normal horizontal position as shown in Figure 1.

When it is desired to release the vehicle braking mechanism, the operator again grasps the manipulating handle 63 and rotates the same in a counterclockwise direction thus rotating tube 30 to a position in which the projection 34 engages the wall 33 of the notch in the flange 31 of tube 30, the wall 33 determining the extent of rotational movement of the tube 30. With the tube in this position the smooth or un-notched portion of the tube is brought into engagement with the walls 56 of one of the pawls 52 or 53, viz., whichever pawl is in engagement with a tooth in the tube, the smooth portion of the tube serving to lower the pawl in engagement with a tooth on the tube until the toothed portion thereof is completely out of engagement as well as out of the path of the pawls 52 and 53 the relative positions of the pawls 52 and 53 and of the teeth 59 being illustrated in dotted lines in Figure 4. The operator, thus having disengaged the teeth on tube 30 from pawls 52 and 53, may then move the tube longitudinally of bracket 42 and housing 49 to oscillate lever 19 in a clockwise direction as viewed in Figure 1 about the fulcrum 18 thus effecting a release of the vehicle brake mechanism.

It should be noted that the pawls 52 and 53 are so spaced and arranged with respect to the spring of teeth 59 on tube 30 that they will alternately engage teeth 59 and thus obtain a finer adjustment of the tube 30 in brake setting positions. Any number of pawls may be used for retaining the tube 30 in adjusted position and by changing the number of retaining pawls and the spacing of teeth 59 on the tube 30, the fineness of adjustment of the mechanism control for retaining the brakes in "set" position may be varied without departing from the spirit of the invention.

It is apparent that, within the scope of the invention, modifications and different arrangements may be made other than is herein disclosed, and the present disclosure is illustrative merely, the invention comprehending all variations thereof.

What I claim is:

1. Brake control mechanism of the character disclosed, in combination, a support; a lever pivotally connected to said support; a brake actuating cable operably connected to said lever; a member pivoted to one end of said lever; a cylindrical element cooperatively associated with said member, said element having a plurality of teeth formed thereon; an escutcheon; a housing journalled on said escutcheon; a plurality of pawls slidably mounted in said housing arranged for cooperation with the teeth on said cylindrical element; resilient means engageable with said pawls for urging the latter into engagement with said cylindrical element; a spring having connection with said cylindrical element and said member for urging said element toward one position of rotation, said element being arranged for rotational movement with respect to said member for disengaging the slidable pawls from the teeth of said element to effect a release of brake mechanism.

2. Brake control mechanism of the character disclosed, in combination a support; a lever pivotally connected to said support; a clevis pivotally connected to said lever; a brake actuating cable secured to said clevis; a bracket pivoted to one end of said lever; a tube journalled in said bracket and arranged for limited rotational movement with respect thereto, said tube having a plurality of teeth formed in the wall thereof; an escutcheon having an opening to receive said tube; a housing supported upon said escutcheon; a plurality of pawls slidably mounted in said housing and arranged for cooperation with the teeth in said tube; resilient means engageable with said pawls for urging the latter into engagement with the teeth on said tube; a spring connected with said tube and said bracket for resiliently maintaining said tube normally in one position of rotation, manipulating means for said tube whereby the same may be rotated for disengaging the slidable pawls from the teeth of the tube to effect a release of a brake mechanism.

3. Brake controlling mechanism of the character disclosed, in combination a support; a lever pivotally connected to said support; a brake actuating cable operatively connected to said lever; a tube; means connecting said tube to one end of said lever; said tube having a plurality of teeth formed therein; a pawl arranged for cooperation with the teeth in said tube for retaining the latter in adjusted position; resilient means engageable with said pawl for urging the latter into engagement with said tube; one end of said tube being split to form a bifurcated portion, the furcations extending laterally in opposite directions, and a manipulating means of non-metallic material moulded upon said furcations.

4. A mechanism control means of the character disclosed, in combination a support; a lever pivotally connected to said support; a clevis pivotally connected to said lever; a mechanism actuating cable secured to said clevis; a U-shaped member pivoted to one end of said lever; an elongated element cooperatively associated with the member and arranged for limited rotational movement with respect to said member; said element having a plurality of teeth formed therein; a plurality of pawls in said housing arranged for cooperation with the teeth in said element; resilient means engageable with said pawls for urging the latter into engagement with said element; said element being split at one end with portions extending laterally in opposite directions; a manipulating handle formed of non-metallic mouldable material on the laterally extending portions of said element whereby said element may be extended to actuate mechanism to be controlled and rotated to effect a disengagement of said pawls with the teeth on said element to effect a release of the said mechanism.

5. Vehicle brake control mechanism of the character disclosed, in combination a support; a lever pivotally connected to said support; a clevis pivotally connected to said lever; a brake actuating cable secured to said clevis; a member pivoted to one end of said lever; a tube cooperatively associated with said member, said tube having a plurality of teeth formed therein; an escutcheon arranged adjacent the other extremity of said tube; a housing journalled on said escutcheon; a plurality of pawls slidably mounted in said housing arranged for cooperation with the teeth in said tube; resilient means engageable with said pawls for urging the latter into engagement with said tube; a spring having connections with said tube and said member for maintaining said tube normally in one position of rotation with respect to said member; and a manipulating handle arranged to effect a rotation of said tube for disengaging the slidable pawls from the teeth of the tube to effect a release of the brake mechanism.

CLIFFORD M. HELLER.